US005596234A

United States Patent [19]

Umeda et al.

[11] Patent Number: 5,596,234

[45] Date of Patent: Jan. 21, 1997

[54] METHOD OF DISPOSING ANTENNA OF REMOTE CONTROL DEVICE FOR VEHICLE

[75] Inventors: Fumio Umeda; Takahisa Noda; Yuji Shibagaki; Yukio Iwasaki; Yoshio Nakano, all of Aichi-ken, Japan

[73] Assignee: Kabushiki Kaisha Tokai-Rika-Denki-Seisakusho, Niwa-gun, Japan

[21] Appl. No.: 433,511

[22] PCT Filed: Nov. 18, 1993

[86] PCT No.: PCT/JP93/01692

§ 371 Date: Jun. 9, 1995

§ 102(e) Date: Jun. 9, 1995

[87] PCT Pub. No.: WO94/11602

PCT Pub. Date: May 26, 1994

[30] Foreign Application Priority Data

Nov. 19, 1992 [JP] Japan .................................... 4-130487

[51] Int. Cl.$^6$ .............................. B60R 25/00; H01Q 1/32

[52] U.S. Cl. ........................ 307/10.2; 180/287; 307/10.1; 340/825.69; 343/712; 343/715

[58] Field of Search .................................... 307/9.1, 10.1, 307/10.2, 10.5; 180/287; 340/825.69, 825.72; 343/711–713, 715, 900, 895

[56] References Cited

U.S. PATENT DOCUMENTS 4,755,823 7/1988 Ohe et al. .............................. 343/713
4,758,166 7/1988 Bonnett et al. ......................... 343/712
4,760,394 7/1988 Takeuchi et al. .................. 340/825.69
4,811,024 3/1989 Ohe et al. ............................... 343/712
4,968,984 11/1990 Katoh et al. ............................ 343/713
5,134,392 7/1992 Takeuchi et al. .................. 340/825.69

FOREIGN PATENT DOCUMENTS

3820248A1 1/1989 Germany .
4105826A1 9/1991 Germany .
4141504A1 8/1992 Germany .
57-4804 1/1982 Japan .
62-37475 2/1987 Japan .
62-178001 8/1987 Japan .
2243955 2/1991 United Kingdom .

OTHER PUBLICATIONS

English language translation of abstract of DE 4,141,504 A1.
German Office Action for corresponding German Patent Application P 43 95 837. 035 with English Language Translation.

*Primary Examiner*—William M. Shoop, Jr.
*Assistant Examiner*—Richard T. Elms
*Attorney, Agent, or Firm*—Oliff & Berridge

[57] ABSTRACT

A method of disposing an antenna of a remote control device for a vehicle in which an antenna is disposed so that a direction in which efficiency of the antenna becomes a predetermined value or more and an opposing direction of a pair of conductors, among a plurality of conductors existing at a periphery of a region at which the antenna is disposed, whose opposing distance with the antenna therebetween is smallest, substantially correspond. Benefits of the antenna improve without a deterioration in vehicle appearance.

7 Claims, 8 Drawing Sheets

METHOD OF DISPOSING ANTENNA OF REMOTE CONTROL DEVICE FOR VEHICLE

TECHNICAL FIELD

The present invention relates to a method of disposing an antenna of a remote control device for a vehicle which is applied to remote control devices for vehicles which remote-control the unlocking and locking of doors or the like of the vehicle, the starting of the engine, or the like.

BACKGROUND TECHNOLOGY

Conventionally, keyless entry systems have been proposed in which the unlocking and locking of a lock mechanism, which locks the doors of a vehicle, the luggage compartment door or the like with the doors in a closed state, is carried out without using a key. This keyless entry system is equipped with a portable transmitter. A switch for indicating unlocking or locking is provided at the transmitter. A code signal which is predetermined for each vehicle is transmitted in accordance with operation of the switch by the user.

The code signal transmitted from the transmitter is received by an antenna attached to the vehicle. By checking the received code signal with a code signal stored in advance, a determination is made as to whether the correct code signal has been received. In a case in which the correct code signal has been received, the lock mechanism is unlocked or locked by a driving means such as a solenoid or the like. In this way, locking and unlocking of the lock mechanism can be effected without using a manual key.

In a keyless entry system, the radio waves outputted from the transmitter are weak waves (500 μV/m or less) which do not require a license stipulated by law. As a result, in order to reliably operate the keyless entry system in accordance with the designations of the user, efficient reception of the radio waves outputted from the transmitter is desired. In order to efficiently receive the radio waves in this way, it is preferable that the antenna is provided so as to project from the vehicle body. However, drawbacks arise in that, when the antenna is disposed in this way, the appearance of the vehicle deteriorates, and the workability when the antenna is attached to the vehicle is also low.

These drawbacks with respect to appearance and workability are solved by providing the antenna within the receiving unit. However, the position at which the receiving unit is disposed is generally a region which is difficult for the radio waves to reach and which has a low electrical field strength, such as within the luggage compartment space, under a seat, at the reverse side of the instrument panel or the like. Therefore, there are cases in which it is difficult to receive the radio waves.

DISCLOSURE OF THE INVENTION

The present invention has been achieved by taking the above facts into consideration, and an object thereof is to provide a method of disposing an antenna of a remote control device for a vehicle in which a remote control device for a vehicle can be reliably operated in accordance with designations of a user and without the appearance of the vehicle deteriorating.

In order to achieve the above-described object, in the method of disposing an antenna of a remote control device for a vehicle of the present invention which remote control device has a transmitter which transmits a predetermined radio wave determined in advance; an antenna disposed within a body of a vehicle; and process designating means for designating execution of a predetermined process in a case in which the predetermined radio wave is received by the antenna, the antenna is disposed so that a direction in which the efficiency of the antenna becomes a predetermined value or more and an opposing direction of a pair of conductors, among a plurality of conductors existing at the periphery of a region at which the antenna is disposed, whose opposing distance with the antenna therebetween is the smallest, substantially correspond.

The configuration of a vehicle body is complex. When a radio wave is transmitted from the transmitter toward the vehicle, there are various orientations of electrical fields generated within the body at the respective regions. However, the inventors of the present invention measured, at respective regions within the body and with respect to various directions, the strengths and orientations of the electrical fields generated within the vehicle body when radio waves are transmitted toward the vehicle from the transmitter. The present inventors found that, at the respective regions within the body, the orientation of the generated electrical field corresponds to the opposing direction of a pair of conductors whose opposing distance, with the measurement region therebetween, is the smallest.

Accordingly, in the present invention, the antenna of a remote control device for a vehicle is disposed within the vehicle body, and is disposed so that the opposing direction of the pair of conductors, among the plurality of conductors existing at the periphery of region at which the antenna is disposed, which pair of conductors has the smallest opposing distance with the antenna therebetween, and a direction in which the efficiency of the antenna is a predetermined value or more, substantially correspond. In this way, the orientation of the electrical field at the region at which the antenna is disposed (when the electrical field is hypothetically thought of as a pile of a plurality of equipotential planes, the direction in which the interval between equipotential planes is smallest) and a direction in which the efficiency of the antenna is greater than or equal to a predetermined value (in a electrical field type antenna, the direction in which an electric potential difference is easy to obtain) substantially correspond. Because a high electric potential difference is applied to the antenna, radio waves can be received very efficiently.

In this way, radio waves transmitted from the transmitter can be reliably received. Predetermined processes including unlocking and locking of the lock mechanisms provided at doors of the vehicle are effected reliably by the processing means of the remote control device for a vehicle in accordance with the designations of a user. Further, because there is no need to provide the antenna such that the antenna projects from the vehicle body, the appearance of the vehicle does not deteriorate.

As a technology which is somewhat related to the present invention, measuring the direction in which the electrical field strength is greatest at the region at which the antenna is disposed and matching the directivity of the antenna to that direction is widely used in cases such as setting the antenna of a television or the like. However, in the field of automobiles, the orientation of the electrical field at the region at which the antenna is disposed cannot be measured in actuality at the design stage of the vehicle. Accordingly, it is difficult to determine in advance the appropriate placement of the antenna, the members disposed at the periphery of the antenna and the like, before the vehicle is manufactured. However, if the present invention is applied, an effect is achieved in that appropriate placement of the antenna can be determined in advance.

The process designations effected by the process designating means are not limited to designations for unlocking and locking lock mechanisms provided at the doors. For example, the process designations may be a designation for unlocking or locking a lock mechanism provided at a luggage compartment door, or a designation for starting the engine of the vehicle or the like. Further, the states of the vehicle, including the amount of gasoline remaining or the locked state of the doors of the vehicle or the like, may be detected, and the process designation may be a designation to send radio waves expressing the results of detection of the states. In this way, the transmitter can be provided with a receiving function and a display function, so that the transmitter receives radio waves transmitted due to the designations from the process designating means and displays the states of the vehicle determined on the basis of the received radio waves. The service for the user is thereby improved. In this case as well, an effect is achieved in that operation is effected reliably in accordance with the designations from the user.

As described above, in the present invention, the antenna is disposed within the body of the vehicle, and is disposed so that the opposing direction of the pair of conductors, among the plurality of conductors existing at the periphery of the region at which the antenna is disposed, which pair of conductors has the smallest opposing distance with the antenna therebetween, and the direction in which the efficiency of the antenna is a predetermined value or more, substantially correspond. Therefore, superior effects are achieved in that the appearance of the vehicle does not deteriorate, and the remote control device for a vehicle operates reliably in accordance with designations of the user.

BEST MODE FOR IMPLEMENTING THE PRESENT INVENTION

Figure 1:
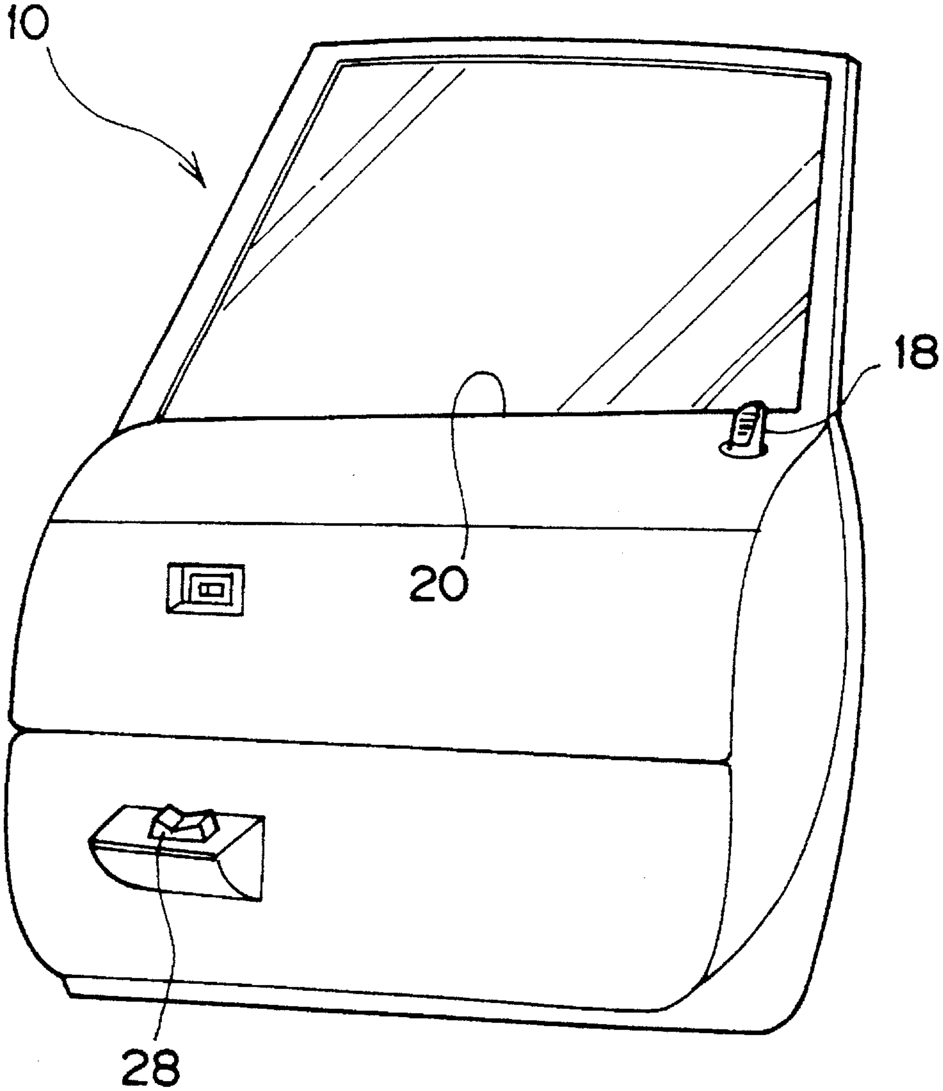
FIG. 1 is a perspective view of a door relating to the present embodiment.
Figure 2:
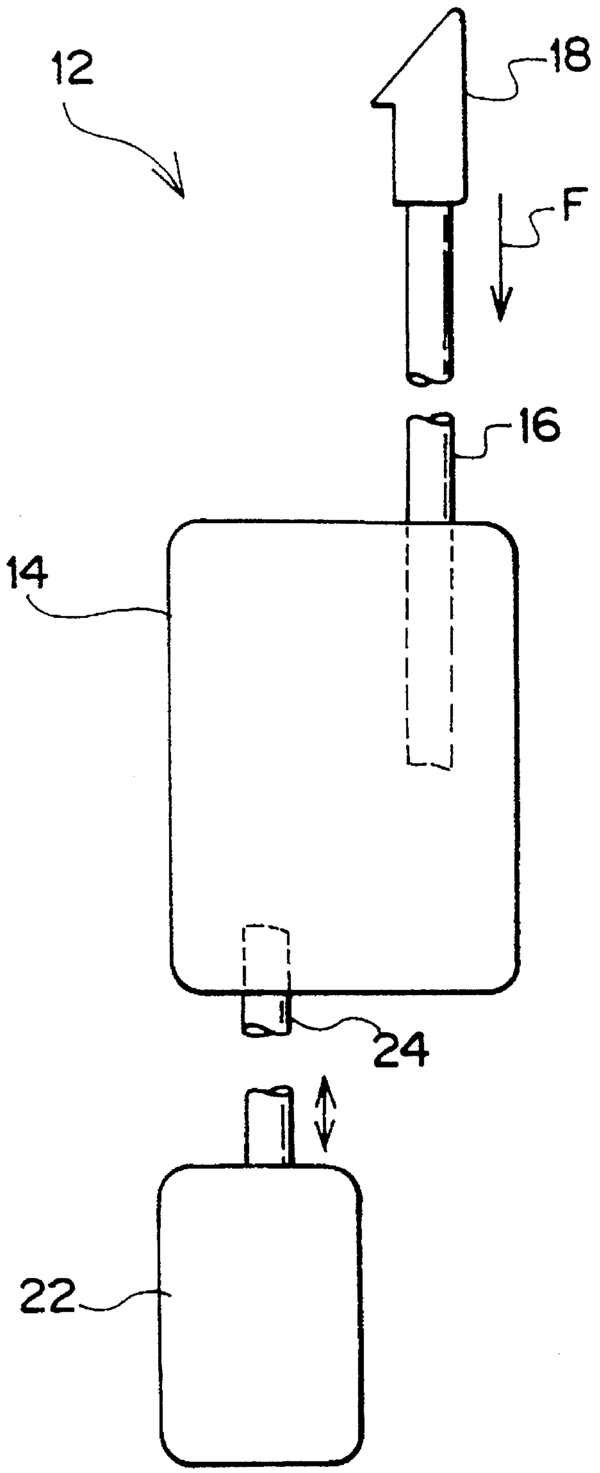
FIG. 2 is a front view illustrating a connected state of a door lock mechanism.

Hereinafter, an embodiment of the present invention will be described in detail with reference to the drawings. In the present embodiment, as the designation effected by the process designating means in a remote control device for a vehicle to which the present invention is applied, description will be given of an example of a case of effecting a designation for unlocking and locking a lock mechanism provided at a vehicle door. A door 10 of a vehicle is illustrated in FIG. 1. A lock mechanism 12 such as that illustrated in FIG. 2 is attached to the interior portion of the door 10. The lock mechanism 12 is equipped with a door lock assembly 14. A link 16 is disposed at the door lock assembly to project from the door lock assembly 14. A door lock knob 18 is attached to the distal end portion of the link 16.

The door lock knob 18 projects toward the top of the vehicle from a vicinity of the door glass bottom edge 20 of the door 10. When a user riding in the vehicle pushes the door lock knob 18 down toward the bottom of the vehicle, the link 16 moves in the direction of arrow F in FIG. 2 so that the door lock assembly 14 is set in a locked state and opening of the door 10 is prevented. Further, by pulling the door lock knob 18 upward, the link 16 moves in the opposite direction of the direction of arrow F in FIG. 2, and the locked state of the lock mechanism 12 by the door assembly 14 is canceled (unlocked).

Further, the distal end portion of a plunger 24 of a solenoid 22 is inserted into the door lock assembly 14. The plunger 24 is connected to the link 16. The lock mechanism 12 is provided at each door of the vehicle (in the present embodiment, there are four doors), and solenoids 22A, 22B, 22C, 22D (see FIG. 5) are attached to the respective lock mechanisms 12. Relays 26A, 26B, 26C, 26D are connected to the solenoids 22A through 22D, respectively. The relays 26A through 26D are connected to an unillustrated door lock control circuit.

A switch which is attached to a door lock switch 28 (see FIG. 1) and another switch which is attached to an unillustrated key cylinder and which turns on and off in accordance with the rotation of the key cylinder, are connected to the door lock control circuit. In accordance with the operation of the door lock switch 28 and the rotation of the key cylinder, the door lock control circuit either supplies to the relays 26A through 26D a drive signal which turns the contacts on, or stops the supply of the drive signal. In a state in which electric power is not being supplied, the plungers 24 of the solenoids 22A through 22D are held by the urging force of an unillustrated urging means at positions at which the lock mechanisms 12 are in locked states. When the contacts of the relays 26A through 26D are closed, the plungers 24 are moved against the urging force to positions at which the lock mechanisms 12 are in unlocked states.

Figure 5:
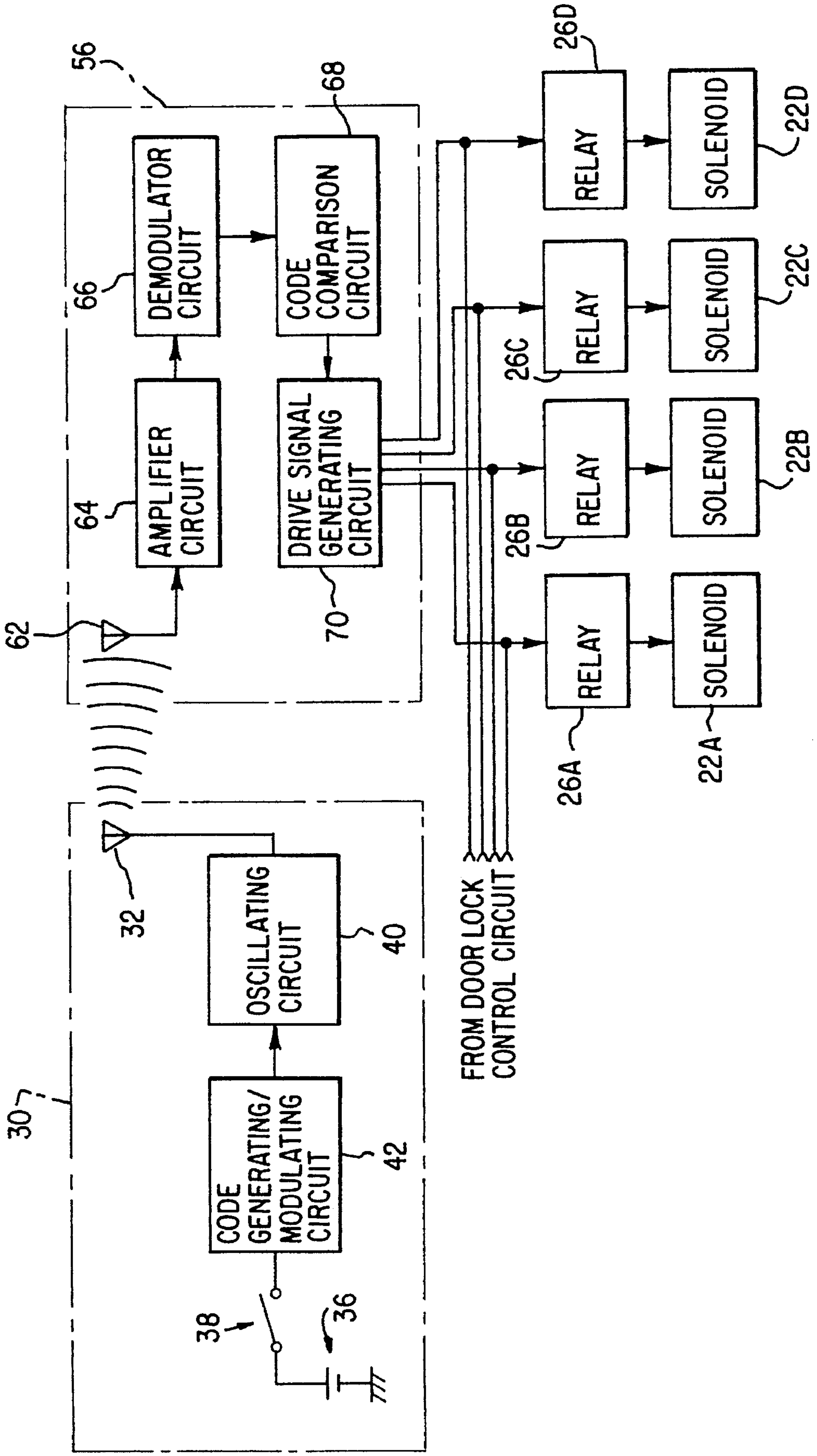
FIG. 5 is a schematic block diagram illustrating structures of a transmitting unit and the receiving unit.

A transmitter 30 which constitutes a portion of the remote control device for a vehicle of the present invention is illustrated in FIG. 5. The transmitter 30 is relatively small so as to facilitate carrying thereof by the user. The transmitter 30 is provided with a designating switch 38 for designating transmission of radio waves. One end of the designating switch 38 is connected to the plus terminal of a battery 36 which serves as a power source. The other end of the designating switch 38 is connected to a code generating/modulating circuit 42. A code, which is predetermined and different for each vehicle, is stored in the code generating/modulating circuit 42. The minus terminal of the battery 36 is grounded. An oscillating circuit 40 which outputs a uniform high-frequency signal and an antenna 32 are connected in succession to the code generating/modulating circuit 42.

Figure 3:
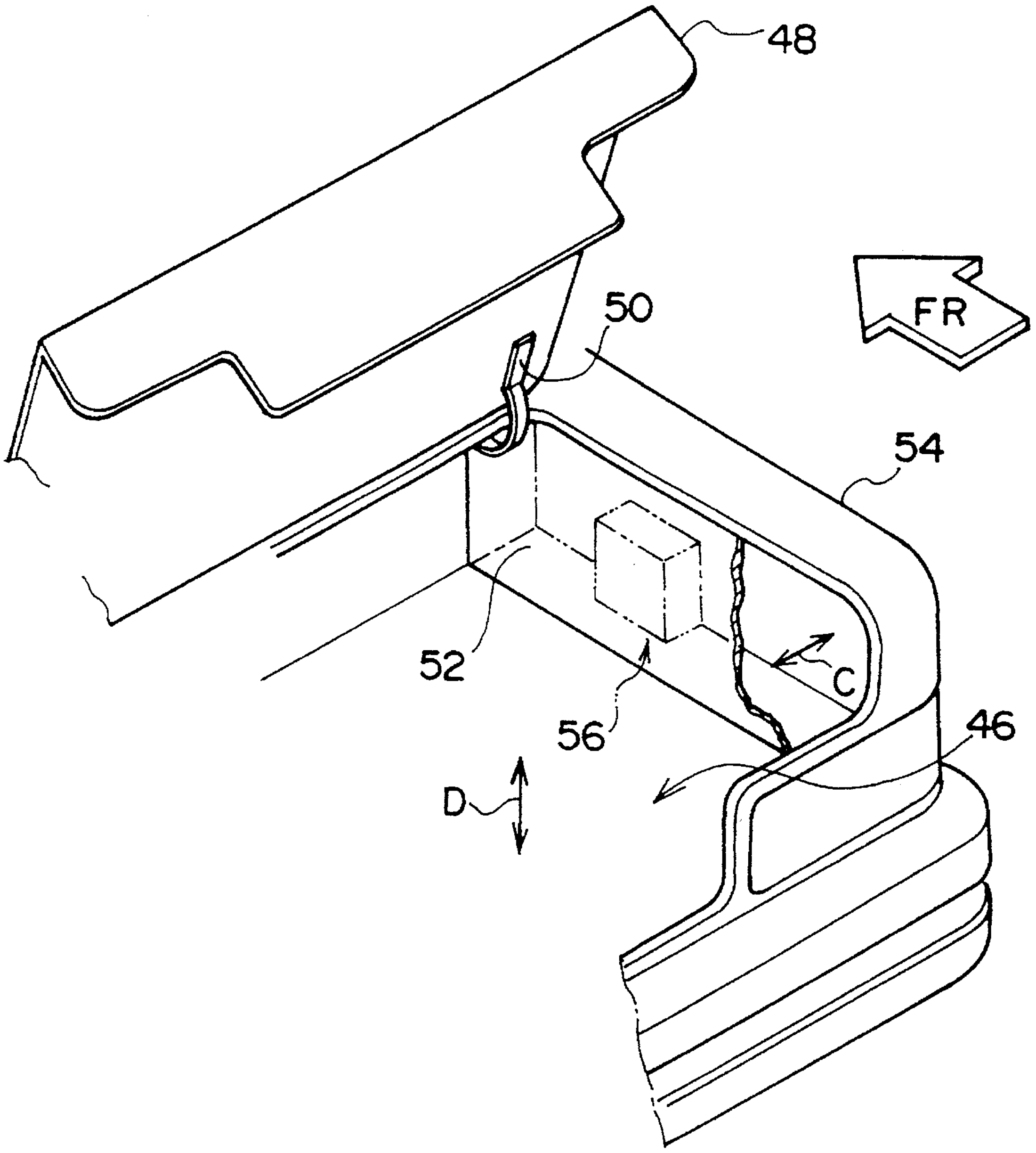
FIG. 3 is a perspective view of a vicinity of a rear end portion of a vehicle, illustrating a position at which a receiving unit is disposed.

As illustrated in FIG. 3, a luggage compartment space 46 for housing luggage or the like is formed at the interior of the vehicle at the rear end side of the vehicle. Further, a luggage compartment door 48 is pivotably attached to the vehicle via hinges 50. The open region of the luggage compartment space 46 is closed by the luggage compartment door 48. Metal reinforcing plates 52 are formed upright at the end portions of the luggage compartment space 46 in the transverse direction of the vehicle (only one reinforcing plate 52 is illustrated in FIG. 3). A receiving unit 56 is disposed between the reinforcing plate 52 and a quarter panel 54.

The receiving unit 56 is equipped with a printed board 58 (see FIG. 4) on which various circuits (to be described later) are disposed. The printed board 58 is disposed so as to be parallel to the quarter panel 54 and the reinforcing plate 52. The periphery of the printed board 58 is covered by a casing 60. A helical antenna 62 is formed upright at the printed board 58. The conductor wire of the helical antenna 62 is formed so as to be wound round in a coil-shape. The helical antenna 62 is disposed such that the axial direction of the coil-shape (the directions of arrow A in FIG. 4) is orthogonal to the surface of the printed board 58. As the degree of correspondence of the axial direction of the coil to the orientation of the electrical field generated at the region at which the helical antenna 62 is disposed increases, the efficiency increases, and the efficiency is at a maximum when the axial direction and the orientation correspond. Therefore, the helical antenna 62 is disposed so that the direction in which efficiency is a maximum substantially corresponds to the opposing direction of the quarter panel 54 and the reinforcing plate 52.

An amplifier circuit 64, a demodulator circuit 66, a code comparison circuit 68 and a drive signal generating circuit 70 illustrated in FIG. 5 are disposed on the printed board 58. These circuits constitute a portion of the processing means of the present invention. The helical antenna 62 is connected to the input terminal of the amplifier circuit 64, and the output terminal of the amplifier circuit 64 is connected to the input terminal of the demodulator circuit 66. The output terminal of the demodulator circuit 66 is connected to the input terminal of the code comparison circuit 68. The code comparison circuit 68 is equipped with a storing means such as a ROM or the like. In the same way as the code generating/modulating circuit 42 of the transmitter 30, a predetermined code different for each vehicle is fixedly stored in advance in this ROM. The output terminal of the code comparison circuit 68 is connected to the input terminal of the drive signal generating circuit 70. The output terminal of the drive signal generating circuit 70 is connected to the respective signal input terminals of the relays 26A through 26D.

Next, operation of the present embodiment will be described. In a case in which a user will get into a vehicle which is stopped and whose doors 10 are locked by the lock mechanisms 12, in order to unlock the lock mechanisms 12, the user directs the antenna 32 of the transmitter 30 corresponding to the vehicle towards the vehicle, and turns the designating switch 38 ON. With the turning on of the designating switch 38, electric power is supplied to the code generating/modulating circuit 42 and the oscillating circuit 40, and the code generating/modulating circuit 42 and the oscillating circuit 40 are operated. At the code generating/modulating circuit 42, the high-frequency signal generated at the oscillating circuit 40 is modulated (e.g., frequency modulated) in accordance with the stored code. The modulated high-frequency signal is supplied to the antenna 32, and a radio wave representing the code is thereby transmitted from the antenna 32.

Due to this radio wave, an electrical field is generated within the body of the vehicle including the region at which the helical antenna 62 is disposed. The periphery of the region at which the helical antenna 62 is disposed is surrounded by metal which is a conductor. The members whose opposing distance with the helical antenna 62 therebetween is the smallest are the pair of the reinforcing plate 52 and the quarter panel 54. As a result, the orientation of the electrical field generated at the region at which the helical antenna 62 is disposed corresponds to the opposing direction of the reinforcing plate 52 and the quarter panel 54 (the directions of arrow C in FIGS. 3 and 4).

As described above, the helical antenna 62 is disposed so that the direction in which efficiency is greatest substantially corresponds to the opposing direction of the quarter panel 54 and the reinforcing plate 52. Therefore, the direction in which efficiency is a maximum corresponds to the orientation of the electrical field generated at the region at which the helical antenna 62 is disposed, and the radio wave transmitted from the transmitter 30 can be received with high efficiency.

The radio wave received at the helical antenna 62 is inputted to the amplifier circuit 64 as an electric signal, is amplified at the amplifier circuit 64, and is outputted to the demodulator circuit 66. At the demodulator circuit 66, the signal outputted from the amplifier circuit 64 is demodulated (detected), and a code expressed by the signal is extracted. The extracted code is supplied to the code comparison circuit 68. At the code comparison circuit 68, the supplied code and the code stored in advance are compared, and a determination is made as to whether the codes match. Only in a case in which it is determined that the codes match is a designation signal, which designates the switching of the contacts of the relays 26A through 26D, outputted to the drive signal generating circuit 70.

At this time, at the drive signal generating circuit 70, the output of the drive signal for closing the contacts of the relays 26A through 26D is stopped. Electric power is not supplied to the solenoids 22A through 22D, and the plungers 24 of the respective solenoids are maintained at positions at which the lock mechanisms 12 are locked. When a designation signal is inputted from the code comparison circuit 68, the drive signal generating circuit 70 outputs a drive signal to the relays 26A through 26D. In this way, the contacts of the relays 26A through 26D are closed, and electric power is supplied to the solenoids 22A through 22D, and the plungers 24 are moved to the unlocking positions. Accordingly, the user can operate an unillustrated door handle, open the door 10, and get into the vehicle.

In a case in which a determination is made at the code comparison circuit 68 that the codes do not match, a designating signal is not outputted from the code comparison circuit 68, and the lock mechanism 12 is not set in an unlocked state.

Further, in a case in which the user gets out of the vehicle and sets the lock mechanism 12 in a locked state, the user directs the antenna 32 of the transmitter 30 toward the vehicle and turns the designating switch 38 on. A radio wave expressing the same code as that described above is thereby transmitted from the antenna 32, and this radio wave is received at the helical antenna 62. The received radio wave is inputted to the amplifier circuit 64 as an electric signal. A designating signal is inputted to the drive signal generating circuit 70 via the amplifier circuit the demodulator circuit 66, and the code comparison circuit 68.

At this time, at the drive signal generating circuit 70, a drive signal is outputted to the relays 26A through 26D, and when the designating signal is inputted, the outputting of the drive signal is stopped. In this way, the contacts of the relays 26A through 26D open, and the supply of electric power to the solenoids 22A through 22D is stopped, and the plungers 24 move to the locking positions.

In the present embodiment, the helical antenna 62 is disposed so that the direction in which the efficiency of the antenna is greatest corresponds to the opposing direction of the quarter panel 54 and the reinforcing plate 52 which, among the members (conductors) which exist at the periphery of the region at which the helical antenna 62 is disposed, have the smallest opposing distance with the helical antenna 62 disposed therebetween. Therefore, the radio waves transmitted from the transmitter 30 can be received efficiently and reliably, and operation is effected reliably in accordance with the designation of the user. Further, because the helical antenna 62 is disposed at the interior portion of the vehicle, the appearance of the vehicle does not deteriorate.

Figure 4:
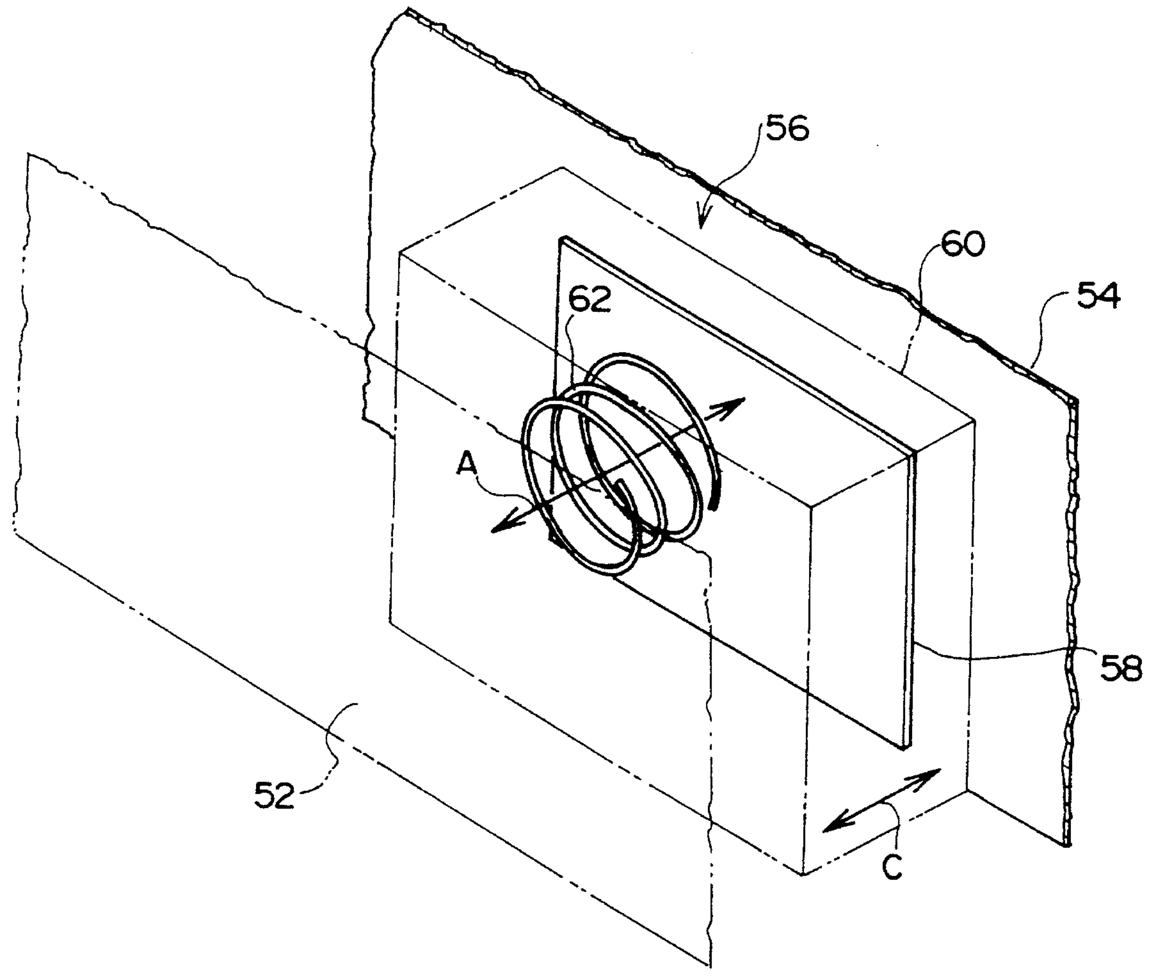
FIG. 4 is a perspective view illustrating the receiving unit and a helical antenna.
Figure 6:
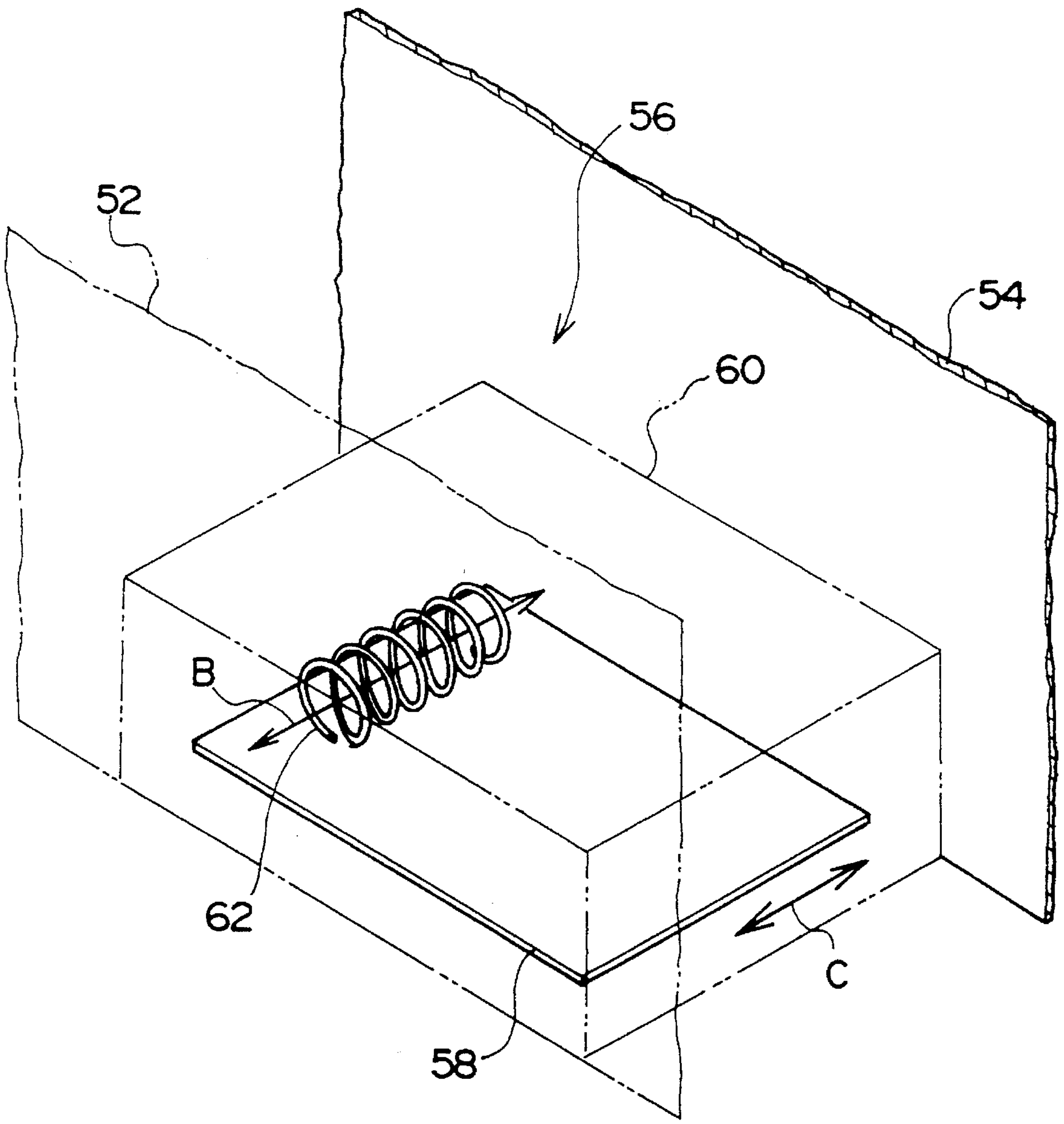
FIG. 6 is a perspective view illustrating another example of placement of the receiving unit and the helical antenna.

An example has been described of a case in FIGS. 4 and 5 in which the helical antenna 62 is provided upright at the printed board 58. However, the present invention is not limited to the same. For example, in a case in which the attachment direction of the printed board 58 is limited for reasons such as interference with other members or the like, e.g., in a case such as that illustrated in FIG. 6 in which it is necessary to dispose the surface of the printed board 58 parallel to the orientation of the electrical field (the directions of arrow C in FIG. 6), the helical antenna 62 may be attached to the printed board 58 such that the axial line of the coil of the helical antenna 62 is parallel to the printed board 58 as illustrated in FIG. 6.

In this way, the direction in which the efficiency of the helical antenna 62 is a maximum (the directions of arrow B in FIG. 6) corresponds to the orientation of the electrical field, and the radio waves can be received reliably. However, when the helical antenna 62 is disposed as illustrated in FIG. 6, the benefits of the antenna deteriorate slightly. Therefore, it is preferable to dispose the helical antenna 62 as illustrated in FIG. 4.

Further, in the present embodiment, an example of a case is described in which the receiving unit 56 including the helical antenna 62 is disposed in a space which is interposed between the reinforcing plate 52 and the quarter panel 54. However, the present invention is not limited to the same. The helical antenna 62 and the receiving unit 56 can be disposed at various regions within the vehicle, for example, within the luggage compartment space 46 or the like as will be described hereinafter.

In a state in which the luggage compartment door 48 is closed, the members (conductors) having the smallest opposing distance at the luggage compartment space 46 interposed between the pair of reinforcing plates 52 are the pair of the luggage compartment door 48 and an unillustrated bottom plate which supports the bottom portion of the luggage compartment space 46. The orientation of the electrical field generated within the luggage compartment space 46 is the vertical direction of the vehicle (the directions of arrow D in FIG. 3). Accordingly, in a case in which the receiving unit 56 is disposed within the compartment space 46, the helical antenna 62 may be disposed so that the direction in which the efficiency of the helical antenna is a predetermined value or more substantially corresponds to the vertical direction of the vehicle.

Figure 7:
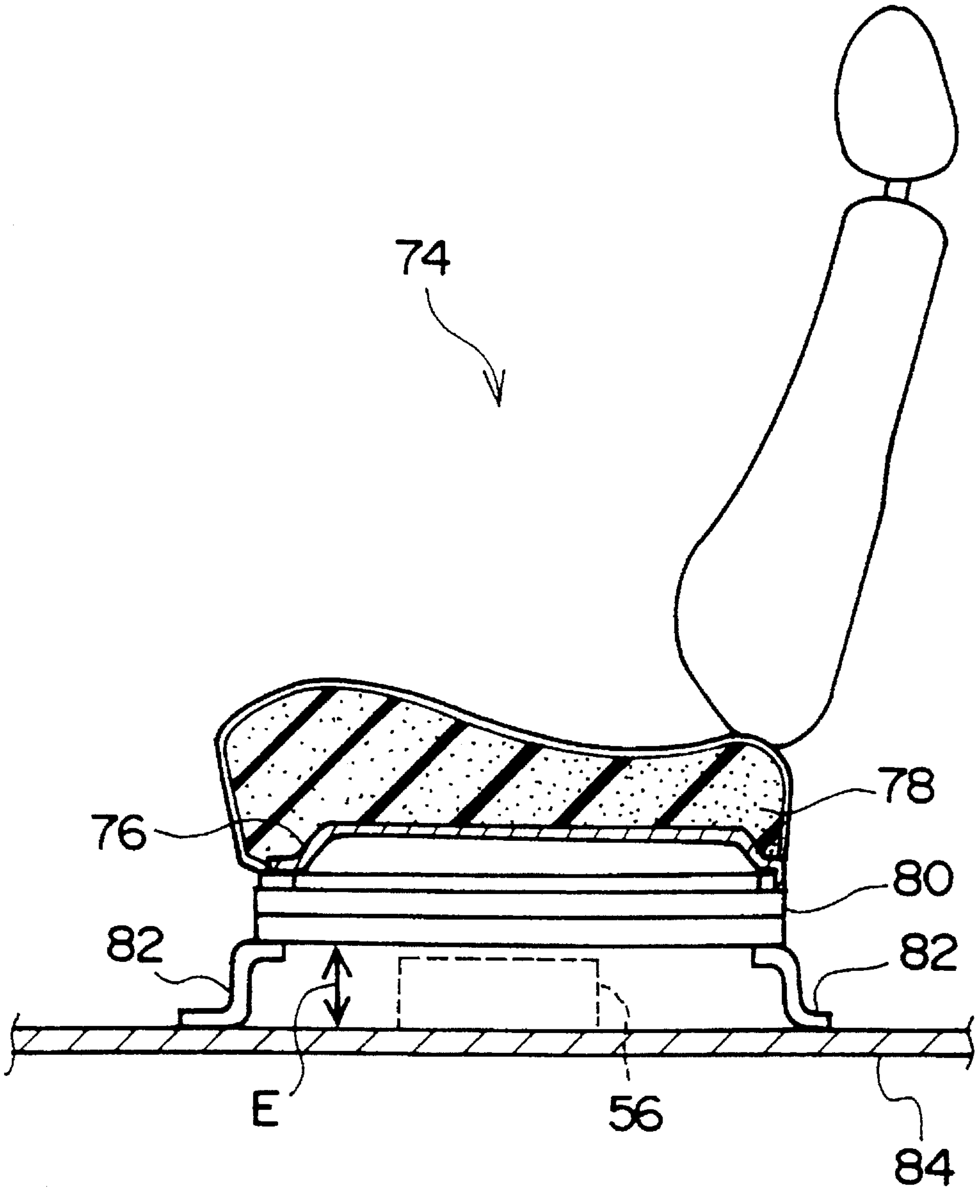
FIG. 7 is a partial cross-sectional view of a seat, for explaining a case in which the receiving unit is disposed under a seat of the vehicle.

Further, the receiving unit 56 may be disposed below a seat of the vehicle. As illustrated in FIG. 7, a vehicle seat 74 is formed such that a sponge 78 is disposed on a metal base member 76 and the surface is covered by fabric or the like. Further, the base member 76 is attached to a floor pan 84 via a slide mechanism 80 and brackets 82. The seat 74 is slidable in longitudinal directions of the vehicle due to the slide mechanism 80.

Under the seat 74, the conductors having the smallest opposing distance are the pair of the base member 76 and the floor pan 84, and the orientation of the electrical field generated beneath the seat 74 is the vertical direction of the vehicle (the directions of arrow E in FIG. 7). Accordingly, in a case in which the receiving unit is disposed beneath the seat 74 as shown by the broken line in FIG. 7, in the same way as described above, the helical antenna 62 may be disposed so that the direction in which the efficiency of the helical antenna 62 is a predetermined value or more substantially corresponds to the vertical directions of the vehicle.

Figure 8:
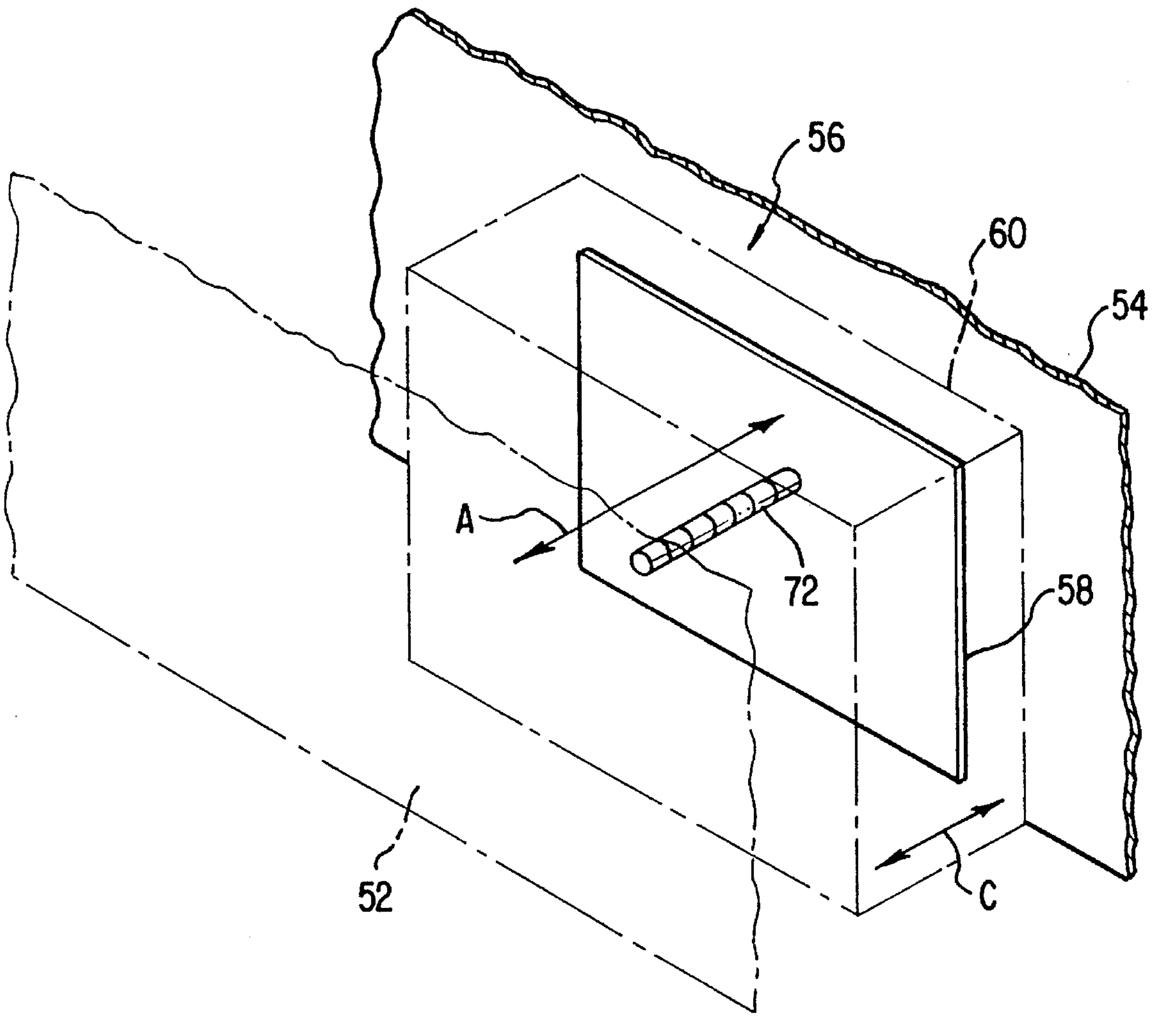
FIG. 8 is a perspective view illustrating a receiving unit and a rod antenna.

Further, in the present embodiment, an example is described of a case in which the helical antenna is used as the antenna. However, the present invention is not limited to the same, and, for example, an electrical field type antenna such as a rod antenna 72 or the like can be applied, as shown in FIG. 8. In this case, the efficiency of the antenna is best when the rod antenna 72 is disposed so that the axial direction of the rod antenna and the opposing direction of the pair of conductors having the smallest opposing distance with the rod antenna therebetween substantially correspond.

In the present embodiment, an example is described of a case in which unlocking and locking of a lock mechanism provided at a door of a vehicle are remote-controlled. However, the present invention is also applicable to cases in which the locking and unlocking of various doors such as a luggage compartment door, a back door fuel filler opening lid, an engine hood or the like are remote-controlled. Further, the present invention can also be applied to a case in which the starting of the engine or the like are remote-controlled.

The transmitter 30 may be provided with the same receiving function as the receiving unit and with a display means such as a liquid crystal display or the like. Further, the receiving unit 56 may be provided with the same transmitting function as the transmitter 30 and with a detecting means for detecting states of the vehicle such as whether the lock mechanism 12 is locked, how much gasoline is remaining and the like. When the user checks the various states of the vehicle by the transmitter 30, the states may be detected at the detecting means of the receiving unit 56, and the results of detection may be transmitted and displayed on the display means of the transmitter 30.

We claim:

1. A method of providing a remote control device for a vehicle that includes a transmitter for transmitting a predetermined radio wave and a receiving unit for receiving the transmitted predetermined radio wave, comprising the steps of:

positioning an electrical field type antenna having a free end within an interior of the vehicle and between a pair of parallel conductors such that an axis of the antenna is substantially perpendicular to the pair of parallel conductors, the antenna extending a distance that is smaller than a distance separating other conductors in a vicinity of the pair of parallel conductors, said pair of parallel conductors are separated by a distance that is smaller than a distance separated iD lh pteK conductors in the vicinity of the pair of conductors;

positioning the receiving unit within the interior of the vehicle at the antenna;

transmitting the predetermined radio wave with the transmitter;

receiving the predetermined radio wave with the receiving unit such that an orientation of an electrical field generated between the pair of parallel conductors by the transmitted predetermined radio wave substantially corresponds to the axis of the antenna, and the antenna receives an electrical field which is generated secondarily by current flowing within a body of the vehicle, whereby the receiving unit receives the predetermined radio wave reliably from a position within the interior of the vehicle.

2. A method of providing a remote control device for a vehicle according to claim 1, further comprising the step of generating a control signal when the receiving unit receives the predetermined radio wave.

3. A method of providing a remote control device for a vehicle according to claim 2, further comprising the step of using the control signal to actuate a locking mechanism of the vehicle.

4. A method of providing a remote control device for a vehicle according to claim 1, wherein the step of positioning the antenna includes positioning a helical antenna such that an axis of the antenna is substantially perpendicular to the pair of parallel conductors.

5. A method of providing a remote control device for a vehicle according to claim 1, wherein the step of positioning the receiving unit includes positioning a flat, plate shaped circuit board between, and substantially parallel to, the pair of parallel conductors.

6. A method of providing a remote control device for a vehicle according to claim 1, wherein the step of positioning the receiving unit includes positioning a flat, plate shaped circuit board between, and substantially perpendicular to, the pair of parallel conductors.

7. A method of providing a remote control device for a vehicle according to claim 1, wherein the step of positioning the antenna includes positioning a rod antenna such that an axis of the antenna is substantially perpendicular to the pair of parallel conductors.

* * * * *